Jan. 3, 1967   R. R. DURFIELD, JR   3,295,184
APPARATUS FOR MAKING SUCCESSIVE SLITS IN SHEET MATERIAL
Filed July 8, 1964   4 Sheets-Sheet 3
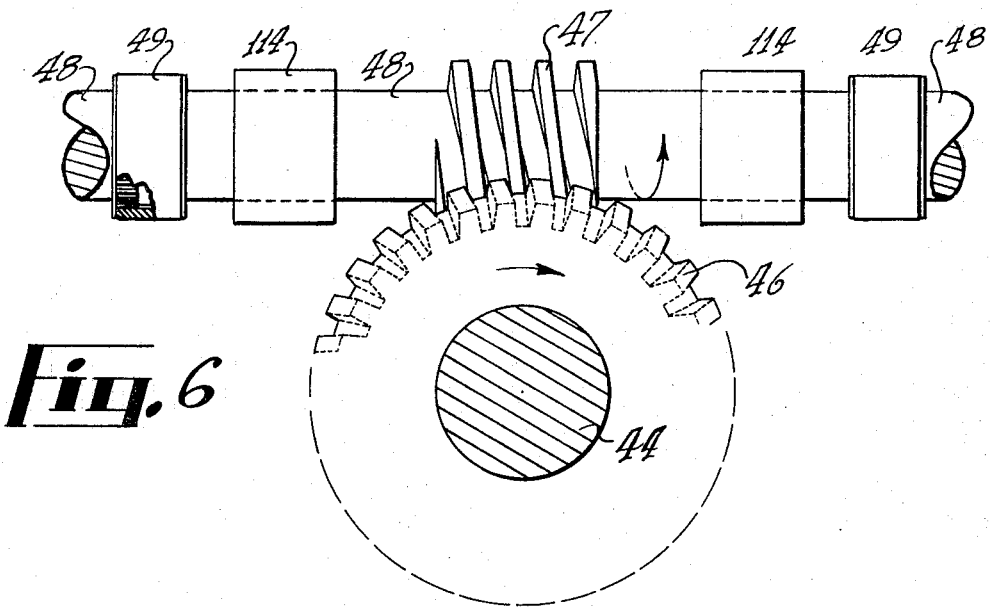
Fig. 6
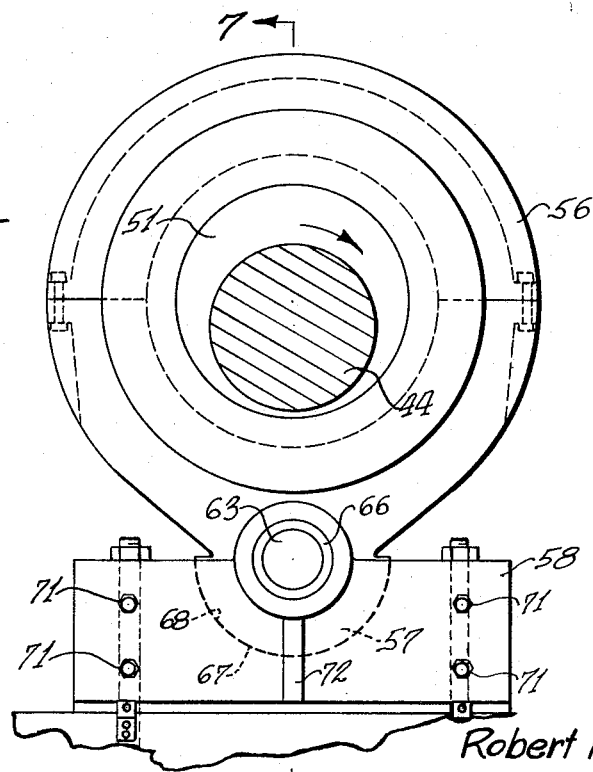
Fig. 5
INVENTOR.
Robert R. Durfield, Jr.
BY
Attorneys Jan. 3, 1967 R. R. DURFIELD, JR 3,295,184
APPARATUS FOR MAKING SUCCESSIVE SLITS IN SHEET MATERIAL
Filed July 8, 1964 4 Sheets-Sheet 4
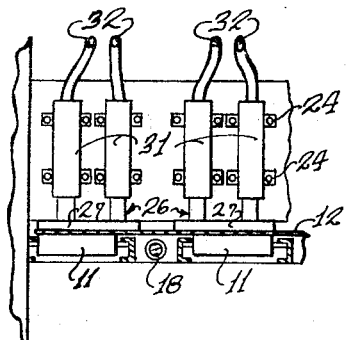
Fig. 10
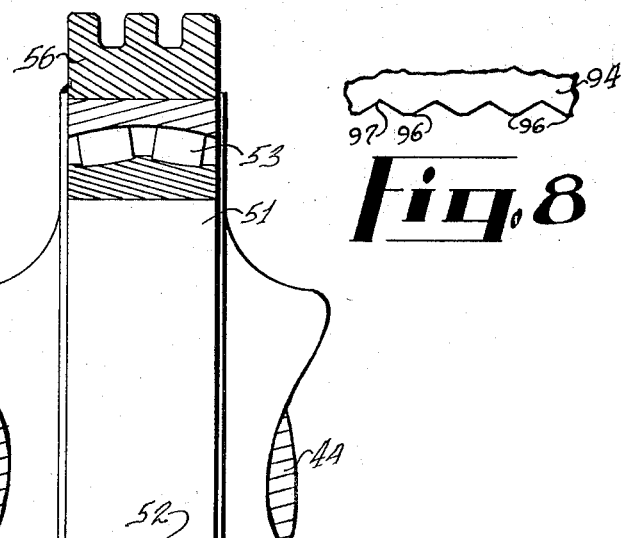
Fig. 8
Fig. 7
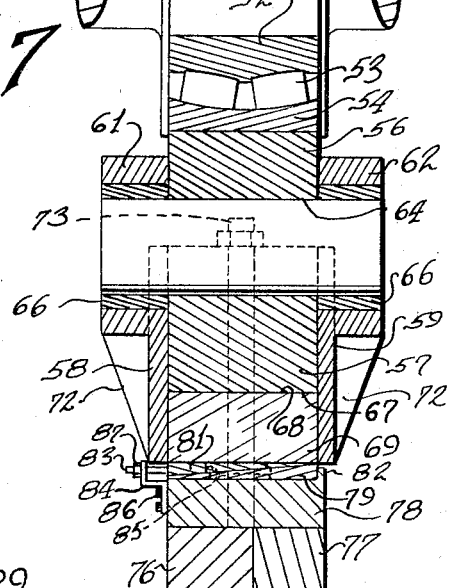
Fig. 9
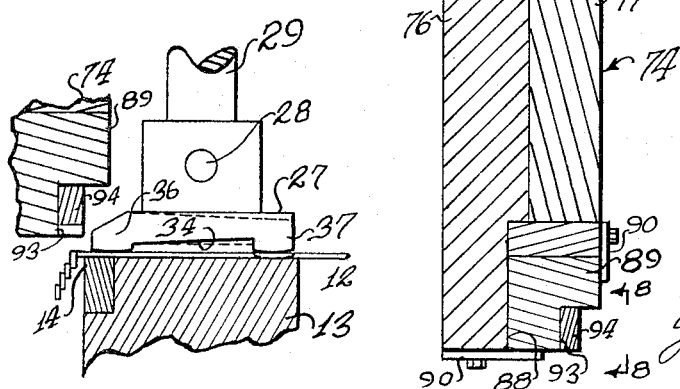
INVENTOR.
Robert R. Durfield, Jr.
BY
Jennings Carter & Thompson
Attorneys

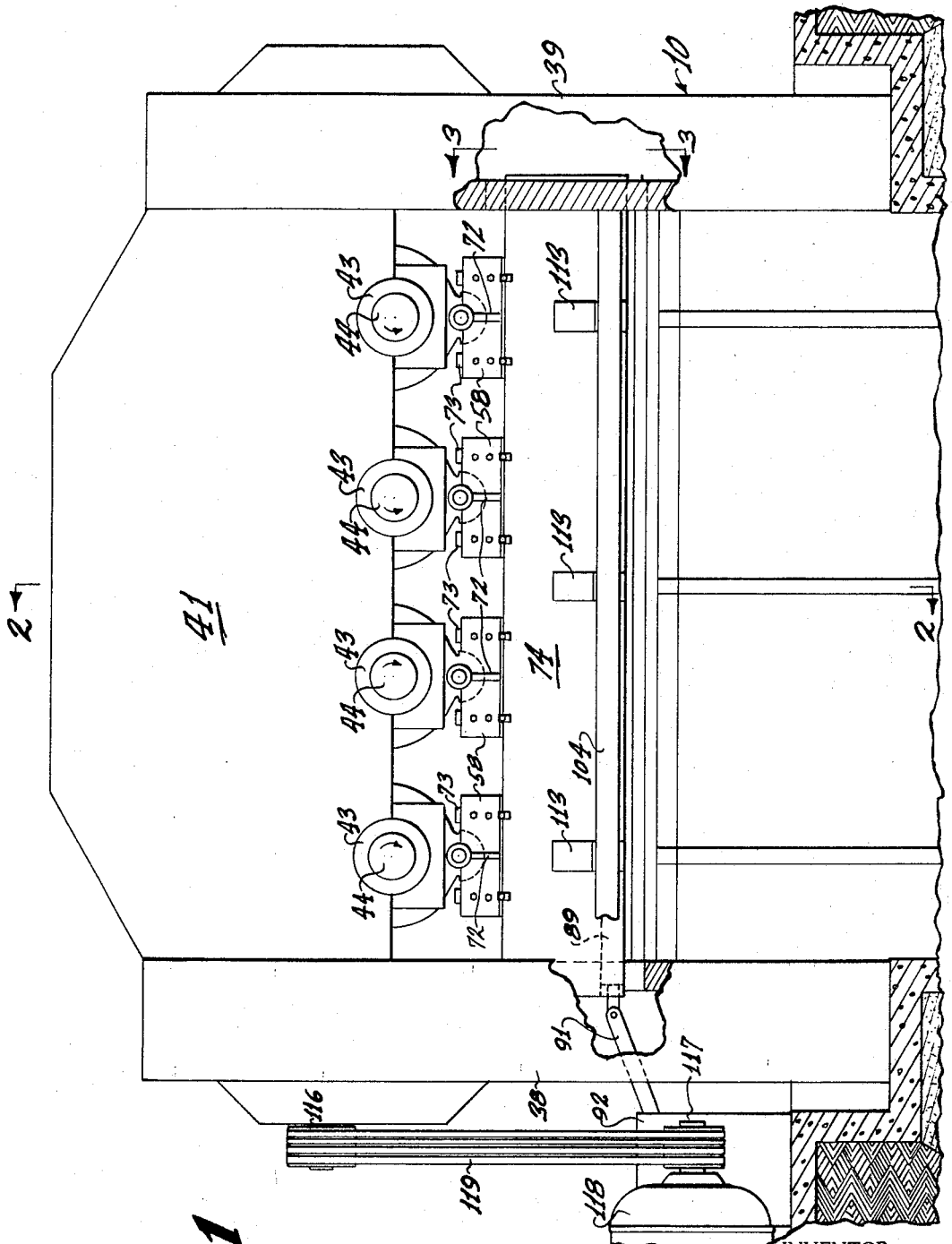

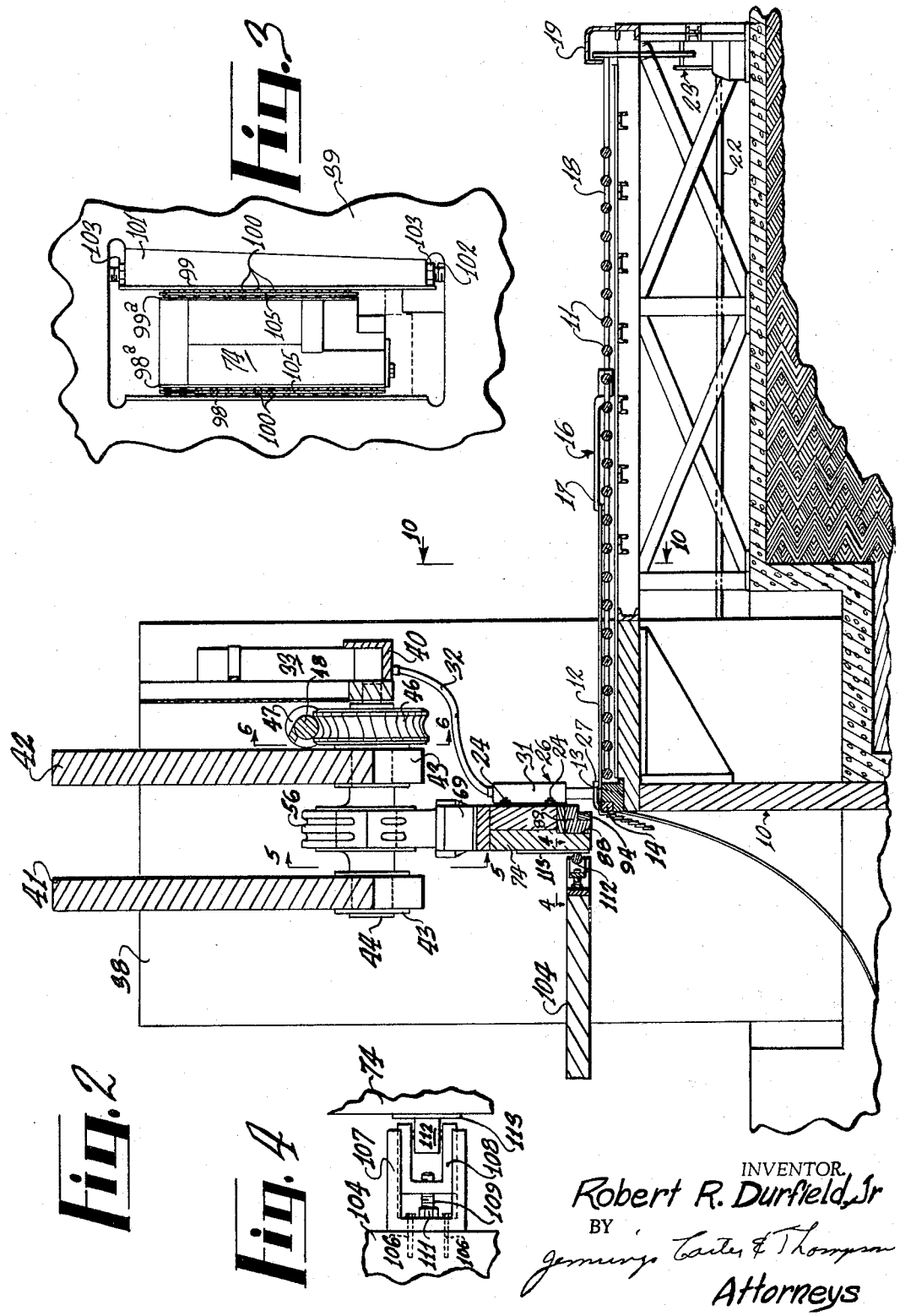

3,295,184
APPARATUS FOR MAKING SUCCESSIVE SLITS IN SHEET MATERIAL

Robert R. Durfield, Jr., Birmingham, Ala., assignor to Alabama Metal Industries Corporation, a corporation of Delaware
Filed July 8, 1964, Ser. No. 381,082
3 Claims. (Cl. 29—6.2)

This invention relates to apparatus for making successive slits in sheet material and more particularly to apparatus for making expanded sheet material.

An object of my invention is to provide apparatus for making successive slits in sheet material in which positive means is employed to move one cutting tool relative to another cutting tool, thereby eliminating complicated driving mechanism and at the same time eliminating the use of resilient means to return the cutting tools to their non-working position.

Another object of my invention is to provide positive hold-down means for the sheet of material being slit whereby the sheet is held accurately in position for the slitting operation.

Another object of my invention is to provide a movable ram having a cutting tool associated therewith, together with adjustable means for positively holding the ram against outward movement relative to a stationary cutting tool.

Another object of my invention is to provide apparatus for making successive slits in a sheet of material in which a plurality of individual power units are associated with a common ram member and means is provided for adjusting the angular positions of the power units relative to each other whereby movement of the ram toward and away from slitting position is controlled accurately.

A further object of my invention is to provide apparatus of the character designated which shall be simple of construction, economical of manufacture and one which is particularly adapted for slitting relatively heavy sheets of material, such as sheet metal and the like.

Heretofore in the art to which my invention relates, various types of apparatus have been proposed for making successive slits in sheet material. However, so far as I am aware, such apparatus embodies separate power means for producing the slitting operation and returning the cutting tools to their non-working positions. That is, the movable cutting tool is moved toward a stationary cutting tool by power means while the movable cutting tool is returned to its original, non-working position by resilient means, such as springs, rubber-like members and the like. Not only is this power means complicated in structure, but it requires a considerable amount of maintenance for satisfactory operation. Also, such apparatus is not adapted for slitting relatively heavy gauge sheets of material, such as metal plates.

Briefly, my improved apparatus for making successive slits in sheet material comprises a movable ram having a cutting tool associated therewith. A stationary cutting tool coacts with the cutting tool carried by the movable ram upon relative movement of the cutting tools. The sheet of material to be slit is fed between the cutting tools by successive movements and power means is positively connected to the ram for moving the ram toward and away from the stationary cutting tool sequentially with the successive movements of the sheet of material.

Apparatus embodying features of my invention is illustrated in the accompanying drawings, forming a part of this application, in which:

FIG. 1 is a front elevational view of my improved apparatus, partly broken away and in section;

FIG. 2 is a sectional view taken generally along the line 2—2 of FIG. 1;

FIG. 3 is an enlarged, fragmental view taken generally along the line 3—3 of FIG. 1;

FIG. 4 is an enlarged, fragmental view taken generally along the line 4—4 of FIG. 2;

FIG. 5 is an enlarged, fragmental view taken generally along line 5—5 of FIG. 2;

FIG. 6 is an enlarged, fragmental view taken generally along the line 6—6 of FIG. 2;

FIG. 7 is an enlarged, sectional view taken generally along line 7—7 of FIG. 5;

FIG. 8 is a fragmental view taken along the line 8—8 of FIG. 7;

FIG. 9 is an enlarged, fragmental view showing the hold-down means for the sheet of material being slit; and, FIG. 10 is a fragmental view taken generally along the line 10—10 of FIG. 2.

Referring now to the drawings for a better understanding of my invention, I show a supporting frame 10 having a plurality of horizontally disposed supporting rollers 11 in position to support a sheet of material 12 to be slit. In the drawings, I show the sheet 12 as being in the form of a metal sheet which is slit to form expanded metal. Extending transversely of the upper forward portion of the supporting frame 10 is a sheet supporting member 13 having a relatively flat upper surface. A stationary cutting tool 14 is mounted adjacent the upper forward edge of the sheet supporting member 13, as shown.

Extending transversely of the rear edge of the sheet of material 12 is a hold-down member 16 having a forwardly extending portion 17 that overlies the rear portion of the sheet 12. The hold-down member 16 is moved relative to the supporting frame 10 in a manner well understood in the art by providing threaded openings in the hold-down member 16 for receiving elongated threaded shafts 18. Suitable sprockets 19 are carried by the rear ends of the shafts 18 for receiving sprocket chains 21 which in turn are operatively connected to a drive shaft 22 by a drive unit indicated generally at 23.

Mounted above the sheet supporting member 13 and secured rigidly to the ram 74 by suitable cap screws 24 are a plurality of hold-down members 26. Each hold-down member 26 comprises a foot portion 27 pivotally connected as at 28 to the lower end of a piston rod 29. Each piston rod 29 is actuated by a fluid pressure operated cylinder 31. Fluid under pressure is supplied to the individual cylinders 31 by supply conduits 32 which communicate with supply cylinders 33. In actual practice, I find that supply cylinders 33 filled with nitrogen gas under high pressure are satisfactory in every respect for actuating the individual cylinders 31. As shown in FIG. 9, the foot portion 27 is provided with a recess 34 in the under surface thereof whereby end portions 36 and 37 of the foot portion 27 engage the sheet of material 12. Accordingly, as the sheet of material 12 is advanced toward the cutting tool 14, the rear edge thereof fits within the recess 34 whereupon the rear portion 37 of the foot member engages the subjacent sheet supporting member 13 to thereby urge the forward portion 36 of the foot member into firm engagement with the sheet of material 12 as it is continuously forced forward by the member 17. It will be understood that the members 17 for moving the sheet 12 forward fit between the hold-down members 26 whereby the entire sheet 12 is fed to a point closely adjacent the cutting tool 14.

As shown in FIG. 1, the supporting frame 10 is provided with upstanding channel-like members 38 and 39 adjacent opposite sides thereof in position to support a transverse member 40 which supports the cylinders 33, as shown in FIG. 2. Extending transversely of the supporting frame 10 between the uptsanding channel-like members 38 and 39 are vertical supporting plates 41 and 42. Laterally spaced bearing members 43 are carried by the lower portions of the plates 41 and 42 in position to support shaft members 44. Mounted on each of the shaft members 44 adjacent the vertical plate 42 is a worm gear 46 which meshes with a worm 47 whereby rotary motion is imparted to the shaft 44 associated therewith. As shown in FIG. 1, two of the shafts 44 are adapted to rotate in one direction while the other two shafts are adapted to rotate in the opposite direction. This may be accomplished by providing a right-hand threaded connection between two of the worms 47 and their associated worm gears 46 and a left-hand threaded connection between the other two worms 47 and their associated worm gears 46. The worms 47 are mounted on individual shaft sections 48 which are connected to each other by gear-type couplings 49. Since gear-type couplings are well known in the art, no further description thereof is deemed necessary. Suffice it to say that the individual shafts 48 carry an annular row of teeth-like members which engage an annular row of teeth carried by the sleeve-like member which forms the outer housing for the gear coupling 49. Accordingly, adjacent shafts 48 may be rotated to selected angular poistions relative to each other to thereby synchronize movement of the shafts 44.

Mounted on each of the shafts 44 between the vertical supporting plates 41 and 42 is an eccentric member 51. Secured to the outer surface of the eccentric member 51 is an inner bearing race 52 for bearings 53. An outer bearing race 54 surrounds the bearings 53 and is encased by a substantially annular yoke-like member 56 having a depending lower portion 57. Secured to opposite sides of the depending portion 57 of the yoke-like member are vertically extending side members 58 and 59 having outturned annular flanges 61 and 62, respectively, which define openings for receiving a connecting rod 63 that extends through a suitable opening 64 provided in the depending portion 57 of the yoke-like member 56. Suitable bearing sleeve members 66 are mounted within the annular flanges 61 and 62 in position to engage the outer surface of the connecting rods 63. The lower surface of the yoke-like member 56 is generally semi-circular as at 67 and is adapted to engage a corresponding, semi-circular recess 68 provided in a bearing block 69. Suitable bolt members 71 secure the bearing block 69 to the vertical side members 58 and 59, as shown in FIG. 5. Also, suitable brace members 72 are mounted between the upstanding side members 58 and 59 and the annular flanges associated therewith, as shown in FIG. 7.

Secured to the bearing blocks 69 by suitable bolts 73 is a transverse ram indicated generally at 74. Preferably, the ram 74 comprises a pair of vertical members 76 and 77 and a horizontal top member 78. The members 76, 77 and 78 are secured rigidly to each other by suitable means to provide a composite ram. The position of the ram 74 relative to the under surface of the bearing block member 69 is adjusted by providing wedge-like members 79 and 81 therebetween. An upstanding stop member 82 is carried by the upper edge of the ram 74 in position to limit outward movement of the wedge member 79. The wedge member 81 is moved relative to the wedge member 79 by an adjusting bolt 83 which extends through a threaded opening provided in a bracket 84 which in turn is secured to the ram 74 by suitable cap screws 86. The threaded bolt is held in selected positions by a lock nut 87 whereby the ram 74 is held in fixed positions relative to the bearing block 69. It will thus be seen that the ram 74 may be adjusted whereby the lower edge thereof extends parallel to the stationary cutting tool 14. Suitable elongated openings 85 are provided in the wedge members 79 and 81 for receiving the bolts 73.

The lower rear corner of the ram 74 is cut away as at 88 to provide a recess for receiving a shuttle bar 89. The shuttle bar is held in place by suitable retainer elements 90 and is reciprocated by a suitable link arrangement 91 which is operatively connected to a cam-actuated unit 92 whereby the shuttle bar 89 is reciprocated each time the ram 74 is actuated. In view of the fact that cam-actuated unit for reciprocating the shuttle bar 89 constitutes conventional apparatus for making expanded sheet material, no further description thereof is deemed necessary.

As shown in FIGS. 2 and 9, the lower rear portion of the shuttle bar 89 is cut away as at 93 to provide a recess for receiving a cutting tool 94. The cutting tool 94 is secured rigidly to the shuttle bar by suitable means. As shown in FIG. 8, the cutting tool 94 is provided with a cutting edge which is shaped to provide alternate transverse projections 96 and recesses 97 which are disposed to move relative to the stationary cutting tool 14 to thereby sever spaced apart, transverse slits in the sheet of material 12. After formation of the slits in the sheet of material 12, the portions thus severed are forced outwardly of the plane of the sheet in a manner well understood in the art to form expanded sheet material. The drive shaft 22 for moving the sheet of material 12 forward by successive movements is operatively connected to the means for supplying power to the shafts 48 whereby movement of the ram 74 is synchronized with movement of the sheet of material 12. Accordingly, a series of transversely aligned slits are formed in the sheet of material and as a continuation of the slitting operation, the severed metal is stretched outwardly of the plane of the sheet of material. After each slitting operation, the sheet of material 12 is advanced by the hold-down member 16 and the shuttle bar 89 is actuated to move the movable cutting tool 94 transversely of the sheet 12 whereby the slits are formed opposite the unsevered portions of the sheet. In other words, the slits are made opposite the portions unsevered by the previous movement of the cutting tool 94.

The upstanding frame members 38 and 39 carry vertical bearing plates 98 and 99, as shown in FIG. 3. The vertical bearing plate 99 is moved to selected positions relative to the ram 74 by a wedge-type adjusting member 101 which is mounted on a threaded shaft 102 and held in fixed positions by lock nuts 103. The ends of the ram 74 carry vertical bearing plates 98a and 99a which are disposed opposite the bearing plates 98 and 99. Roller bearings 100 are mounted between the bearing plates and are held in parallel relation to each other by a vertical retainer element 105 having suitable elongated openings therein for receiving the bearings 100.

Extending transversely between the upstanding side members 38 and 39 adjacent the forward side of the ram 74 is a backing plate 104. Secured to the rear edge of the backing plate 104 by cap screws 106 are a plurality of rearwardly extending U-shaped brackets 107. Mounted for sliding movement within each U-shaped bracket 107 is a movable bracket 108 which is also generally U-shaped, as shown in FIG. 4. Extending through a suitable opening in the base of the U-shaped bracket 108 is a threaded member 109 which is in threaded engagement with a suitable opening through the base of the U-shaped bracket 107. The threaded member 109 is held in selected positions relative to the U-shaped bracket 107 by a lock nut 111. Mounted for rotation adjacent the forward end of the U-shaped bracket 108 is a roller 112 which is in position to engage a bearing plate 113 carried by the ram 74, as shown in FIGS. 1, 2 and 4. The rollers 112 thus engage the bearing plate 113 to limit forward movement of the ram 74 as it moves downwardly relative to the stationary cutting tool 14.

As shown in FIG. 6, the shafts 48 are supported by suitable bearing members 114. Also, one of the shaft members 48 is operatively connected to a drive shaft 116 which is operatively connected to a power shaft 117 of a drive motor 118 by a suitable flexible drive indicated generally at 119. It will be understood that the drive shaft 116, the cam actuated member 92 and the drive shaft 22 for advancing the sheet of material 12 are all synchronized whereby they operate in time relation to each other.

From the foregoing description, the operation of my improved apparatus will be readily understood. The sheet of material 12 is positioned on the supporting rolls 11 and is advanced by successive movements imparted by the drive shaft 22. As the ram 74 and its cutting tool 94 are moved downwardly relative to the stationary cutting tool 14, a series of transversely spaced slits are made in the sheet of material 12. After cutting the slits in the sheet of material 12, the cutting tool 94 continues its downward movement to depress or stretch the severed metal to form expanded metal. The ram 74 is then raised as the yoke member 56 is raised by the rotating eccentric 51. Prior to making the next slit in the sheet of material 12, the shuttle bar is shifted laterally relative to the ram 74 and the subjacent sheet of material and the sheet of material is fed forward whereby the next row of transversely spaced slits are positioned opposite the portions unsevered by the previous operation. This procedure is repeated until the entire sheet is formed into expanded metal.

The fluid pressure operated cylinders 31 are actuated prior to each slitting operation whereby the hold-down units 26 are moved into firm engagement with the sheet 12.

From the foregoing, it will be seen that I have devised improved apparatus for forming successive slits in a sheet of material. By providing positive means for moving the cutting element both toward and away from the sheet of material being severed, I eliminate entirely the necessity of providing resilient means for returning the cutting element and the mechanism associated therewith to the inoperative position. Also, by providing positive drive means in combination with positive hold-down means preventing shifting of the sheet relative to the cutting elements, my apparatus is particularly adapted for severing relatively heavy gauge sheet material. Furthermore, by providing relatively short drive shafts for driving each of the eccentric units, together with means adjusting the angular position of the short shafts relative to each other, my apparatus may be adjusted in a minimum of time whereby all of the eccentrics rotate in proper timed relation to each other. By rotating one-half of the eccentrics in one direction and the other half in the opposite direction, my improved apparatus is well-balanced and trouble-free in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. Apparatus for making successive slits in sheet material comprising:
 (a) a movable ram,
 (b) a shuttle bar mounted for lateral movement relative to said ram,
 (c) a first cutting tool carried by said shuttle bar,
 (d) a second cutting tool in position to coact with said first cutting tool upon relative movement of the cutting tools,
 (e) means to feed a sheet of material between said cutting tools by successive movements,
 (f) a rotatable shaft,
 (g) a plurality of rotatable members eccentrically mounted on said shaft,
 (h) an annular yoke surrounding each of said eccentrically mounted rotatable members and adapted for rotation relative thereto,
 (i) means pivotally and positively connecting one side of each yoke to said ram to move said ram toward and away from said second cutting tool in response to rotation of said rotatable members and sequentially with said successive movements of said sheet to sever spaced apart, transverse slits in said sheet and then force the portions thus severed outwardly of the plane of said sheet, and
 (j) means to reciprocate said shuttle bar laterally relative to the direction of movement of said sheet of material sequentially with severing said spaced apart, transverse slits to make successive slits opposite unsevered portions of said sheet.

2. Apparatus for making successive slits in sheet material as defined in claim 1 in which said one side of the yoke is connected to the ram by a connecting rod and a bearing block, said one side of the yoke having a curved bearing surface disposed to engage a curved recess provided in said bearing block to provide additional bearing area.

3. Apparatus for making successive slits in sheet material as defined in claim 1 in which an adjustable limit member is mounted in position to engage the forward side of said ram as viewed in the direction of movement of said sheet of material to limit forward movement of said ram.

References Cited by the Examiner
UNITED STATES PATENTS

| | | | |
|---|---|---|---|
| 2,244,305 | 6/1941 | McNeil | 29—6.2 |
| 2,322,204 | 6/1943 | Ballard | 29—6.2 |
| 3,183,575 | 5/1965 | Skeel | 29—6.2 |
| 3,216,083 | 11/1965 | Acker | 29—6.2 |

RICHARD H. EANES, Jr, *Primary Examiner.*